US008553720B2

(12) United States Patent
Bishara et al.

(10) Patent No.: US 8,553,720 B2
(45) Date of Patent: Oct. 8, 2013

(54) ADAPTIVE SPEED CONTROL FOR MAC-PHY INTERFACES

(75) Inventors: Nafea Bishara, San Jose, CA (US); William Lo, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 361 days.

(21) Appl. No.: 11/696,476

(22) Filed: Apr. 4, 2007

(65) Prior Publication Data

US 2007/0248118 A1 Oct. 25, 2007

Related U.S. Application Data

(60) Provisional application No. 60/793,118, filed on Apr. 19, 2006.

(51) Int. Cl.
*H04J 3/16* (2006.01)
*G01R 31/08* (2006.01)

(52) U.S. Cl.
USPC .......................... 370/469; 370/230; 370/232

(58) Field of Classification Search
USPC .................. 370/230, 231, 232, 235, 236
See application file for complete search history.

(56) References Cited

U.S. PATENT DOCUMENTS

| 4,320,520 | A |   | 3/1982  | Graham |
| 4,914,394 | A |   | 4/1990  | Meyer |
| 5,420,512 | A |   | 5/1995  | Spillane et al. |
| 5,461,318 | A |   | 10/1995 | Borchert et al. |
| 5,905,870 | A | * | 5/1999  | Mangin et al. ............... 709/234 |
| 6,081,523 | A | * | 6/2000  | Merchant et al. ............ 370/389 |
| 6,138,080 | A |   | 10/2000 | Richardson |
| 6,141,352 | A | * | 10/2000 | Gandy ........................ 370/463 |
| 6,167,029 | A | * | 12/2000 | Ramakrishnan ............. 370/235 |
| 6,198,727 | B1 |   | 3/2001  | Wakeley et al. |
| 6,295,281 | B1 |   | 9/2001  | Itkowsky |
| 6,377,640 | B2 |   | 4/2002  | Trans |

(Continued)

FOREIGN PATENT DOCUMENTS

EP 1 848 154 10/2007
WO WO01/11861 2/2001

(Continued)

OTHER PUBLICATIONS

IEEE Std 802.3x-2005; Section Two (Clause 21 through Clause 33 and Annex 22A thruogh Annex 32A); Information technology—Telecommunications and information exchange between systems—Local and metropolitan area networks—Specific requirements—Part 3: Carrier Sense Multiple Access with Collision Detection (CSMA/CD) access method and physical layer specifications; 810 pages.

(Continued)

*Primary Examiner* — Kevin C Harper
*Assistant Examiner* — Samina Choudhry

(57) ABSTRACT

Apparatus having corresponding methods and computer programs comprise a first first-in first-out buffer (FIFO) to receive and store data from a media access controller (MAC); a physical-layer device (PHY) to transmit a signal representing the data; and a control circuit comprising a read circuit to transfer the data from the first FIFO to the PHY, and a transmit pause circuit to transmit a pause frame to the MAC when an amount of the data stored in the first FIFO exceeds a predetermined threshold.

51 Claims, 2 Drawing Sheets

(56) References Cited

U.S. PATENT DOCUMENTS

| | | | |
|---|---|---|---|
| 6,434,716 B1 | 8/2002 | Johnson et al. | |
| 6,438,163 B1 | 8/2002 | Raghavan et al. | |
| 6,448,899 B1 | 9/2002 | Thomspon | |
| 6,522,152 B1 | 2/2003 | Tonti et al. | |
| 6,535,983 B1 | 3/2003 | McCormack et al. | |
| 6,600,755 B1 | 7/2003 | Overs et al. | |
| 6,694,017 B1 | 2/2004 | Takada | |
| 6,728,216 B1 | 4/2004 | Sterner | |
| 6,775,529 B1 | 8/2004 | Roo | |
| 6,825,672 B1 | 11/2004 | Lo | |
| 6,829,223 B1 | 12/2004 | Richardson | |
| 6,882,661 B1 | 4/2005 | Creedon et al. | |
| 7,005,861 B1 | 2/2006 | Lo et al. | |
| 7,127,481 B1 | 10/2006 | Lam | |
| 7,161,911 B1 | 1/2007 | Fang et al. | |
| 7,203,851 B1 | 4/2007 | Lo et al. | |
| 7,286,469 B2 | 10/2007 | Kauschke et al. | |
| 7,317,732 B2 | 1/2008 | Mills et al. | |
| 7,379,422 B2 * | 5/2008 | Nation | 370/230.1 |
| 7,385,920 B2 * | 6/2008 | Zhang et al. | 370/229 |
| 7,542,415 B2 * | 6/2009 | Kang | 370/229 |
| 7,624,197 B1 | 11/2009 | Lo et al. | |
| 7,649,843 B2 * | 1/2010 | Shanley et al. | 370/235 |
| 7,688,749 B1 | 3/2010 | Lo et al. | |
| 2001/0038674 A1 | 11/2001 | Trans | |
| 2002/0080884 A1 | 6/2002 | Lee | |
| 2002/0124110 A1 | 9/2002 | Tanaka | |
| 2002/0181633 A1 | 12/2002 | Trans | |
| 2004/0120334 A1 | 6/2004 | Nation | |
| 2004/0258085 A1 * | 12/2004 | Costo | 370/445 |
| 2005/0013250 A1 * | 1/2005 | Kauschke et al. | 370/235 |
| 2005/0015535 A1 * | 1/2005 | Lindsay et al. | 710/306 |
| 2005/0141551 A1 | 6/2005 | McNeil | |
| 2006/0045009 A1 | 3/2006 | Madison | |
| 2006/0215626 A1 | 9/2006 | Ross | |
| 2006/0268709 A1 * | 11/2006 | Singla et al. | 370/235 |
| 2006/0280132 A1 | 12/2006 | Connor | |
| 2007/0248024 A1 | 10/2007 | Conway | |
| 2008/0056284 A1 | 3/2008 | Powell et al. | |
| 2008/0069014 A1 | 3/2008 | Powell et al. | |
| 2008/0069144 A1 | 3/2008 | Yu et al. | |
| 2009/0245274 A1 | 10/2009 | Hurwitz et al. | |
| 2010/0046521 A1 * | 2/2010 | Wong | 370/394 |

FOREIGN PATENT DOCUMENTS

| | | |
|---|---|---|
| WO | WO2005/104698 | 11/2005 |
| WO | WO2006/075928 | 7/2006 |
| WO | WO 2007/054815 | 5/2007 |
| WO | WO2007/054815 | 5/2007 |

OTHER PUBLICATIONS

PCT International Search Report and Written Opinion dated Oct. 29, 2007 for International Application No. PCT/US2007/009573; 14 pages.

Intel, "LXT9784 Octal 10/100 Transceiver Hardware Integrity Function Overview" Application Note, Jan. 2001, pp. 3-14.

IEEE Computer Society; IEEE Standard 802.3ab; IEEE Std. 802.3-2002, IEEE Standard for Information Technology—Telecommunications and information exchange between systems—Local and metropolitan area networks—Specific requirements; Part 3: Carrier sense multiple access with collision detection (CSMA/CD) acces method and physical layer specifications, Mar. 8, 2002, pp. 147-249.

PCT International Search Report and Written Opinion dated Oct. 29, 2007 for International Application No. PCT/US2007/0090573; 14 pages.

IEEE Std 802.3x-2005; Section Two (Clause 21 through Clause 33 and Annex 22A through Annex 32A); Information Technology—Telecommunications and information exchange between systems—Local and metropolitan area neworks—Specific requirements—Part 3: Carrier Sense Multiple Access with Collision Detection (CSMA/CD) access method and physical layer specifications; 810 pages.

IEEE Std 802.3-2002 (Revision of IEEE Std 802.3, 2000 Edition); 802.3 IEEE Standard for Information Technology—Telecommunications and information exchange between systems—Local and metropolitan area neworks—Specific requirements—Part 3: Carrier Sense Multiple Access with Collision Detection (CSMA/CD) access method and physical layer specifications; IEEE Computer Society, Sponsored by the LAN/MAN Standards Committee (pp. 1-552).

(Section Two) Information Technology—Telecommunications and information exchange between systems—Local nad metropolitan area networks—Specific requirements—Part 3: Carrier Sense Multiple Access with Collision Deteiction (CMSA/CD) access method and physical layer specifications (pp. 1-581).

(Section Three) Information Technology—Telecommunications and information exchange between systems—Local and metropolitan area networks—Specific requirements—Part 3: Carrier Sense Multiple Access with Collision Detection (CSMA/CD) access method and physical layer specifications (pp. 1-379).

U.S. Appl. No. 09/991,043, filed Nov. 21, 2001; Apparatus and Method for Automatic Speed Downshift for a Two Pair Cable; William Lo; 61 pages.

U.S. Appl. No. 60/217,418, filed Jul. 11, 2000; Finite Impulse Response Filter; Yat-Tung Lam; 35 pages.

International Search Report for Application No. PCT/US2008/086450 (corresponding to U.S. Appl. No. 12/330,823) mailed Mar. 8, 2009.

\* cited by examiner

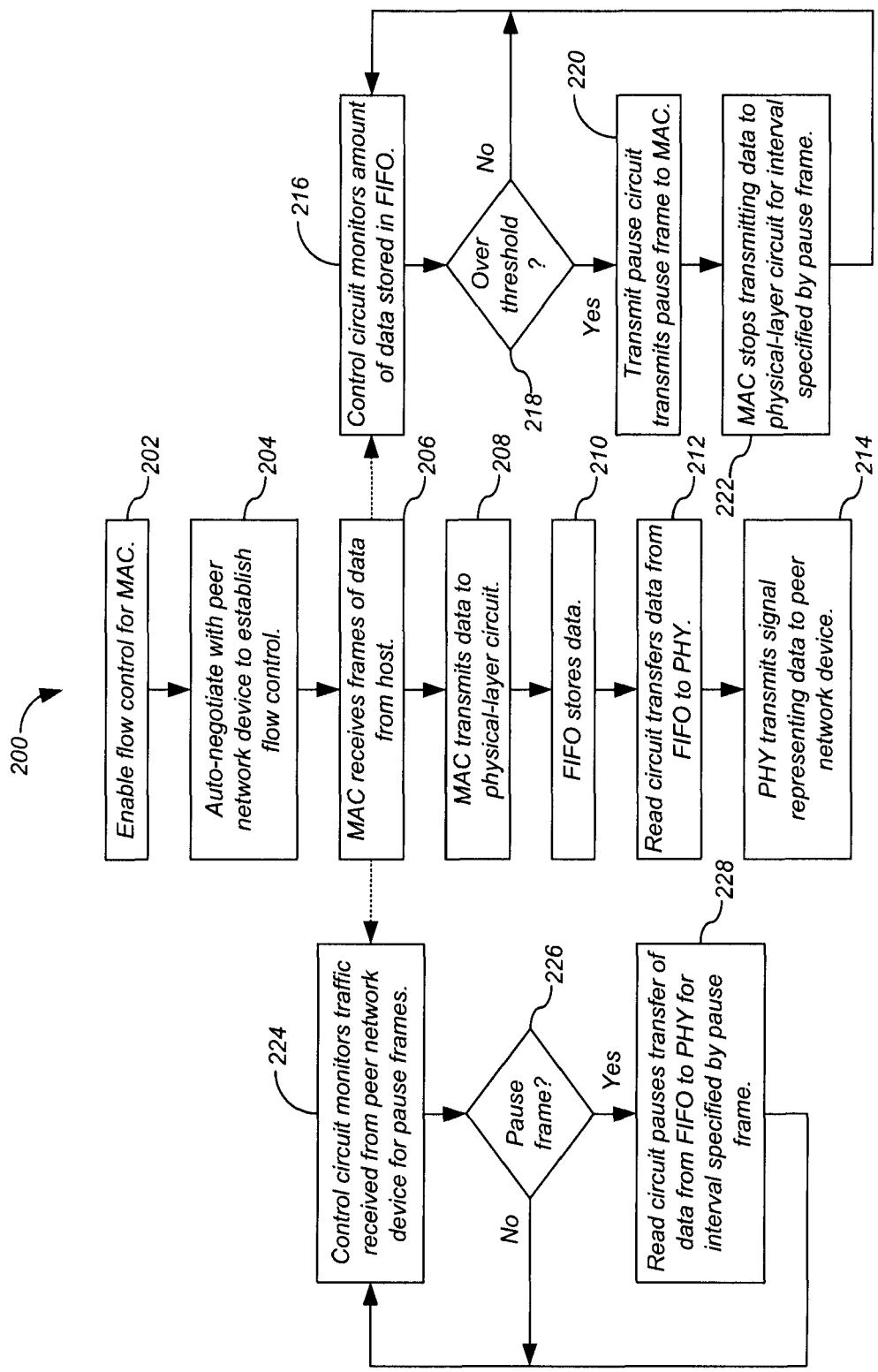

ADAPTIVE SPEED CONTROL FOR MAC-PHY INTERFACES

CROSS-REFERENCE TO RELATED APPLICATIONS

This application claims the benefit of U.S. Provisional Patent Application Ser. No. 60/793,118 filed Apr. 19, 2006, the disclosure thereof incorporated by reference herein in its entirety.

BACKGROUND

The present invention relates generally to data communications. More particularly, the present invention relates to adaptive speed control for interfaces between media access controllers (MAC) and physical-layer devices (PHY).

SUMMARY

In general, in one aspect, the invention features an apparatus comprising: a first first-in first-out buffer (FIFO) to receive and store data from a media access controller (MAC); a physical-layer device (PHY) to transmit a signal representing the data; and a control circuit comprising a read circuit to transfer the data from the first FIFO to the PHY, and a transmit pause circuit to transmit a pause frame to the MAC when an amount of the data stored in the first FIFO exceeds a predetermined threshold.

In some embodiments, the pause frame comprises a IEEE 802.3x pause frame. Some embodiments comprise an integrated circuit comprising the apparatus. Some embodiments comprise the MAC. In some embodiments, the MAC comprises a 10 Gbps single-speed MAC, the PHY comprises a quad-speed PHY having speeds of 10 Mbps, 100 Mbps, 1 Gbps, and 10 Gbps, and the MAC and the PHY communicate over a single-speed interface. In some embodiments, the single-speed interface comprises a XAUI interface. Some embodiments comprise a network device comprising the apparatus. In some embodiments, the network device is selected from the group consisting of: a network switch; a router; and a network interface controller. In some embodiments, the control circuit further comprises: a receive pause circuit to pause the transfer of the data from the first FIFO to the PHY when the PHY receives a second signal representing a second pause frame. In some embodiments, the second pause frame comprises a IEEE 802.3x pause frame. In some embodiments, the PHY receives signals representing frames of data sent by a peer device; and wherein the control circuit drops one or more of the frames of data. Some embodiments comprise management information base (MIB) drop counter to count the dropped frames of the data. Some embodiments comprise a second FIFO to store frames of data received by the PHY from a peer device; wherein the control circuit retrieves the frames of data from second FIFO, and transmits the frames of data to the MAC. In some embodiments, the read circuit transfers the data from the first FIFO to the PHY again when needed in half-duplex mode. In some embodiments, the PHY receives a pause frame from the MAC and transmits a signal representing the pause frame.

In general, in one aspect, the invention features an apparatus comprising: first buffer means for receiving and storing data from a media access controller (MAC); physical-layer means for transmitting a signal representing the data; and means for controlling comprising read means for transferring the data from the first buffer to the physical-layer means, and transmit pause means for transmitting a pause frame to the MAC when an amount of the data stored in the first buffer exceeds a predetermined threshold.

In some embodiments, the pause frame comprises a IEEE 802.3x pause frame. Some embodiments comprise an integrated circuit comprising the apparatus. Some embodiments comprise the MAC. In some embodiments, the MAC comprises a 10 Gbps single-speed MAC, the physical-layer means comprises a quad-speed physical-layer means having speeds of 10 Mbps, 100 Mbps, 1 Gbps, and 10 Gbps, and the MAC and the physical-layer means communicate over a single-speed interface. In some embodiments, the single-speed interface comprises a XAUI interface. Some embodiments comprise a network device comprising the apparatus. In some embodiments, the network device is selected from the group consisting of: a network switch; a router; and a network interface controller. In some embodiments, the means for controlling further comprises: receive pause means for pausing the transfer of the data from the first buffer to the physical-layer means when the physical-layer means receives a second signal representing a second pause frame. In some embodiments, the second pause frame comprises a IEEE 802.3x pause frame. In some embodiments, the physical-layer means receives signals representing frames of data sent by a peer device; and wherein the means for controlling drops one or more of the frames of data. Some embodiments comprise means for counting the dropped frames of the data. Some embodiments comprise second buffer means for storing frames of data received by the physical-layer means from a peer device; wherein the means for controlling retrieves the frames of data from the second buffer means, and transmits the frames of data to the MAC. In some embodiments, the read circuit transfers the data from the first FIFO to the physical-layer means again when needed in half-duplex mode. In some embodiments, the physical-layer means receives a pause frame from the MAC and transmits a signal representing the pause frame.

In general, in one aspect, the invention features a method comprising: storing data received from a media access controller (MAC) at a first data rate; retrieving the stored data at a second data rate; generating a signal representing the retrieved data; and generating a pause frame when an amount of the stored data exceeds a predetermined threshold.

Some embodiments comprise receiving the data from the MAC. Some embodiments comprise transmitting the pause frame to the MAC. In some embodiments, the pause frame comprises a IEEE 802.3x pause frame. Some embodiments comprise receiving signals representing frames of data sent by a peer device; and dropping one or more of the frames of data. Some embodiments comprise counting the dropped frames of data. Some embodiments comprise receiving signals representing frames of data sent by a peer device; storing the frames of data in a buffer; retrieving the frames of data from the buffer; and transmitting the frames of data to the MAC. Some embodiments comprise pausing the retrieving of the data when a second signal representing a second pause frame is received. In some embodiments, the second pause frame comprises a IEEE 802.3x pause frame. Some embodiments comprise generating the signal representing the retrieved data again when needed in half-duplex mode. Some embodiments comprise receiving a pause frame from the MAC; and transmitting a signal representing the pause frame.

In general, in one aspect, the invention features a computer program executable on a processor, comprising: instructions for storing data received from a media access controller (MAC) at a first data rate; instructions for retrieving the stored data at a second data rate; wherein a physical-layer device to generate a signal representing the retrieved data; and instructions for generating a pause frame when an amount of the stored data exceeds a predetermined threshold.

Some embodiments comprise instructions for transmitting the pause frame to the MAC. In some embodiments, the pause frame comprises a IEEE 802.3x pause frame. Some embodiments comprise, wherein signals are received representing frames of data sent by a peer device, instructions for dropping one or more of the frames of data. Some embodiments comprise instructions for counting the dropped frames of data. Some embodiments comprise, wherein signals are received representing frames of data sent by a peer device, instructions for storing the frames of data in a buffer; instructions for retrieving the frames of data from the buffer; and wherein the frames of data are transmitted to the MAC. Some embodiments comprise instructions for pausing the retrieving of the data when a second signal representing a second pause frame is received. In some embodiments, the second pause frame comprises a IEEE 802.3x pause frame. Some embodiments comprise instructions for generating the signal representing the retrieved data again when needed in half-duplex mode.

The details of one or more implementations are set forth in the accompanying drawings and the description below. Other features will be apparent from the description and drawings, and from the claims.

DESCRIPTION OF DRAWINGS

FIG. 2 shows a process for the data communications system of FIG. 1 according to some embodiments of the present invention.

Figure 1:
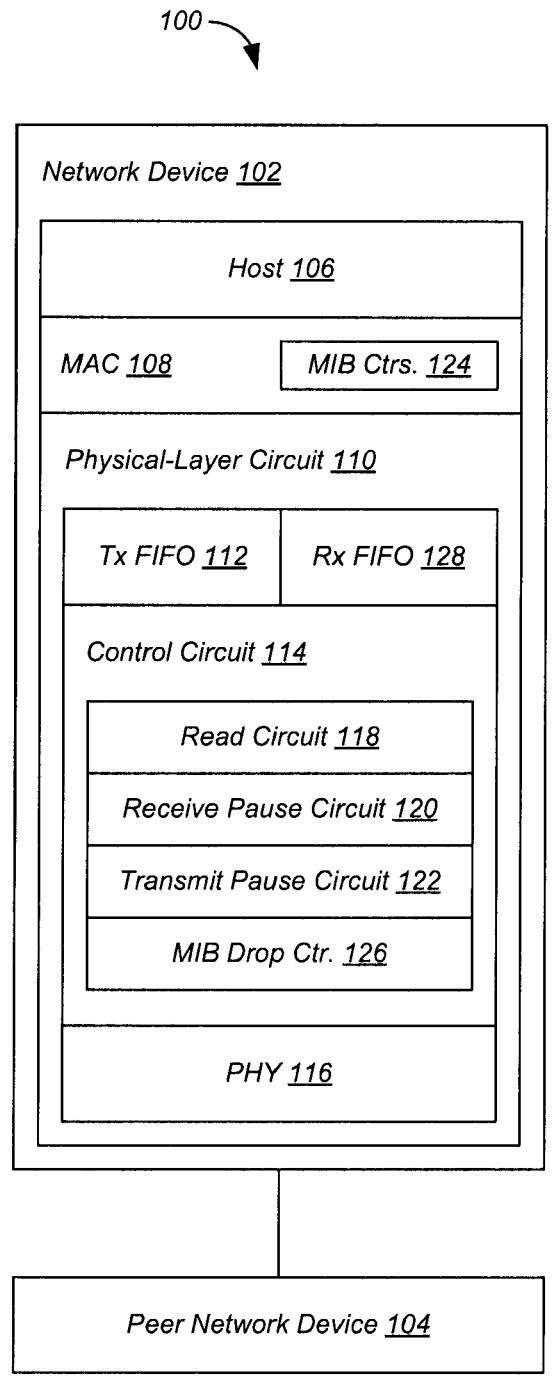
FIG. 1 shows a data communication system comprising a network device in communication with a peer network device according to some embodiments of the present invention.

The leading digit(s) of each reference numeral used in this specification indicates the number of the drawing in which the reference numeral first appears.

DETAILED DESCRIPTION

In conventional data communications systems, a multi-speed media access controller (MAC) is generally connected to a multi-speed physical-layer device (PHY) by a multi-speed interface. In such systems, the PHY speed is set by auto-negotiation, software, or the like, and the MAC adapts its speed accordingly.

However, in some systems, the MAC may not support all the data rates supported by the PHY, or vice versa. For example, when a single-speed MAC is connected by a single-speed interface to a multi-rate PHY, the PHY may operate at a speed that is not supported by the MAC. As another example, even though the MAC and PHY are both multi-speed, either may support a speed not supported by the other.

Embodiments of the present invention provide adaptive speed control for MAC-PHY interfaces. According to these embodiments, a first-in first-out buffer (FIFO) buffers data sent from the MAC to the PHY, and a control circuit sends a pause frame to the MAC when the amount of data in the FIFO exceeds a predetermined threshold. Flow control can be enabled in the MAC according to IEEE standard 802.3x, and each pause frame can comprise an IEEE 802.3x pause frame.

Flow control with peer devices can be implemented by the control circuit. For example, the control circuit auto-negotiates with peer devices to implement flow control according to IEEE standard 802.3x. When the control circuit receives a pause frame from a peer device, the control circuit pauses the flow of data from the FIFO to the PHY.

FIG. 1 shows a data communication system 100 comprising a network device 102 in communication with a peer network device 104 according to some embodiments of the present invention. Network device 102 comprises a host 106 in communication with a media access controller (MAC) 108, which is in communication with a physical-layer circuit 110, which is in communication with peer network device 104. Physical-layer circuit 110 comprises a transmit first-in first-out buffer (FIFO) 112, a control circuit 114, and a physical-layer device (PHY) 116. Control circuit 114 comprises a read circuit 118, a receive pause circuit 120, and a transmit pause circuit 122. MAC 108 can comprise a plurality of conventional management information base (MIB) counters 124. A MIB is a database used to manage network communication devices, as is well-known in the relevant arts. Physical-layer circuit 110 can comprise a MIB drop counter 126 to count dropped frames.

Physical-layer circuit 110 can also include a receive FIFO 128 to buffer data received from peer network device 104. That is, receive FIFO 128 stores frames of data received by PHY 116 from peer network device 104, and control circuit 114 retrieves the frames of data from receive FIFO 128 and transmits the frames of data to MAC 108. Because the data rate of MAC 108 exceeds the data rate of PHY 116, all or nearly all of each frame should be stored in receive FIFO 128 before transmitting the frame to MAC 108 to prevent underrun of receive FIFO 128.

Network device 102 can be implemented as a switch, router, network interface controller (NIC), and the like. Physical-layer circuit 110 can be implemented as one or more integrated circuits.

In some embodiments, MAC 108 is a 10 Gbps single-speed MAC, PHY 116 is a quad-speed PHY having speeds of 10 Mbps, 100 Mbps, 1 Gbps, and 10 Gbps, and MAC 108 and physical-layer circuit 110 communicate over a single-speed interface such as XAUI. In other embodiments, MAC 108 is a multi-speed MAC that communicates with physical-layer circuit 110 over a multi-speed interface.

FIG. 2 shows a process for data communications system 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

When network device 102 boots up, flow control is enabled for MAC 108 (step 202), and control circuit 114 can auto-negotiate with peer network device 104 to establish flow control (step 204). The flow control mechanism can be IEEE 802.3x flow control.

MAC 108 receives frames of data from host 106 to be transmitted to peer network device 104 (step 206), and transmits the data to physical-layer circuit 110 (step 208), which stores the data in FIFO 112 as it is received (step 210). Read circuit 118 transfers the data from FIFO 112 to PHY 116 at the data rate required by PHY 116 (step 212). PHY 116 transmits a signal representing the data to peer network device 104 (step 214).

Control circuit 114 monitors the amount of data stored in FIFO 112 (step 216). Because the data rate of MAC 108 exceeds the data rate of PHY 116, the amount of data stored in FIFO 112 will increase. When the amount of data stored in FIFO 112 exceeds a predetermined threshold (step 218), transmit pause circuit 122 transmits a pause frame to MAC 108 (step 220). The pause frame can be a IEEE 802.3x pause frame, and IEEE 802.3x flow control is always enabled for MAC 108. Therefore, MAC 108 stops transmitting data to physical-layer circuit 110 for the interval specified by the pause frame (step 222).

In some cases, control circuit 114 and peer network device 104 auto-negotiates to implement flow control. Control circuit 114 monitors traffic received from peer network device 104 for the presence of pause frames (step 224). When control circuit 114 determines that a pause frame has been received from peer network device 104 (step 226), read circuit 118 pauses the transfer of data from FIFO 112 to PHY 116 for the interval specified by the received pause frame (step 228). The pause frame is not transferred to MAC 108.

Because flow control is always enabled for MAC 108, MAC 108 may generate pause frames. When physical-layer circuit 110 receives a pause frame from MAC 108, PHY 116 simply transmits a signal representing the pause frame to peer network device 104. In some embodiments, control circuit 114 is also responsible for half-duplex and retransmission if needed. That is, read circuit 118 transfers data from FIFO 112 to PHY 116 again when needed in half-duplex mode, for example following a collision during transmission by PHY 116 of a signal representing the data.

When flow control is disabled with peer network device 104, physical-layer circuit 110 can drop frames of data received from peer network device 104. Because the frames are dropped in physical-layer circuit 110, the drops will not be recorded by MIB counters 124 in MAC 108. Therefore, in some embodiments, physical-layer circuit 110 comprises a MIB drop counter 126 to count the dropped frames.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
   a media access controller;
   a first first-in first-out buffer configured to (i) receive data from the media access controller, and (ii) store the data from the media access controller;
   a physical-layer device; and
   a control circuit comprising
      a read circuit configured to transfer the data from the first first-in first-out buffer to the physical-layer device, wherein the physical layer device is configured to transmit a signal representing the data transferred to the physical layer device, and
      a transmit pause circuit configured to transmit a pause frame to the media access controller when an amount of the data stored in the first first-in first-out buffer exceeds a predetermined threshold,
   wherein, based on the pause frame, the media access controller is configured to adjust a rate at which the media access controller transfers the data from the media access controller to the physical-layer device (i) via the first first-in first-out buffer, and (ii) within the network device, and
   wherein the control circuit is connected between the media access controller and the physical-layer device.

2. The network device of claim 1, wherein the pause frame comprises an IEEE 802.3x pause frame.

3. An integrated circuit comprising the network device of claim 1.

4. The network device of claim 1, wherein:
   the media access controller comprises a 10 Gbps single-speed media access controller;
   the physical-layer device comprises a quad-speed physical-layer device having speeds of 10 Mbps, 100 Mbps, 1 Gbps, and 10 Gbps; and
   the media access controller and the physical-layer device communicate over a single-speed interface.

5. The network device of claim 4, wherein the single-speed interface comprises a 10 gigabit attachment unit interface.

6. The network device of claim 1, wherein the network device is selected from a group consisting of:
   a network switch;
   a router; and
   a network interface controller.

7. The network device of claim 1, wherein the control circuit further comprises a receive pause circuit configured to pause the transfer of the data from the first first-in first-out buffer to the physical-layer device in response to the physical-layer device receiving a second signal representing a second pause frame.

8. The network device of claim 7, wherein the second pause frame comprises an IEEE 802.3x pause frame.

9. The network device of claim 7, wherein:
   the physical-layer device is configured to receive signals representing frames of data sent by a peer device; and
   the control circuit is configured to drop one or more of the frames of data.

10. The network device of claim 9, further comprising a management information base drop counter configured to count the dropped frames of the data.

11. The network device of claim 1, further comprising a second first-in first-out buffer configured to store frames of data received by the physical-layer device from a peer device, wherein the control circuit is configured to (i) retrieve the frames of data from the second first-in first-out buffer, and (ii) transmit the frames of data to the media access controller.

12. The network device of claim 1, wherein the read circuit is configured to transfer the data from the first first-in first-out buffer to the physical-layer device again when needed in half-duplex mode.

13. The network device of claim 1, wherein the physical-layer device is configured to (i) receive a second pause frame from the media access controller, and (ii) transmit a signal representing the second pause frame.

14. A network device comprising:
   a media access controller;
   first buffer means for (i) receiving data from the media access controller and (ii) storing the data from the media access controller;
   physical-layer mean; and
   means for controlling comprising
      read means for transferring the data from the first buffer to the physical-layer means, wherein the physical layer means is configured to transmit a signal representing the data transferred to the physical layer means, and
      transmit pause means for transmitting a pause frame to the media access controller when an amount of the data stored in the first buffer exceeds a predetermined threshold,
   wherein the media access controller is configured to adjust a rate at which the media access controller transfers the data from the media access controller to the physical-layer means (i) via the first buffer means, and (ii) within the network device based on the pause frame, and
   wherein the means for controlling is connected between the media access controller and the physical-layer means.

15. The network device of claim 14, wherein the pause frame comprises an IEEE 802.3x pause frame.

16. An integrated circuit comprising the network device of claim 14.

17. The network device of claim 14, wherein:
   the media access controller comprises a 10 Gbps single-speed media access controller;
   the physical-layer means comprises a quad-speed physical-layer means having speeds of 10 Mbps, 100 Mbps, 1 Gbps, and 10 Gbps; and
   the media access controller and the physical-layer means communicate over a single-speed interface.

18. The network device of claim 17, wherein the single-speed interface comprises a 10 gigabit attachment unit interface.

19. The network device of claim 14, wherein the network device is selected from a group consisting of:
   a network switch;
   a router; and
   a network interface controller.

20. The network device of claim 14, wherein the means for controlling further comprises receive pause means for pausing the transfer of the data from the first buffer to the physical-layer means in response to the physical-layer means receiving a second signal representing a second pause frame.

21. The network device of claim 20, wherein the second pause frame comprises an IEEE 802.3x pause frame.

22. The network device of claim 20, wherein:
   the physical-layer means receives signals representing frames of data sent by a peer device; and
   the means for controlling drops one or more of the frames of data.

23. The network device of claim 22, further comprising means for counting the dropped frames of the data.

24. The network device of claim 14, further comprising second buffer means for storing frames of data received by the physical-layer means from a peer device,
   wherein the means for controlling (i) retrieves the frames of data from the second buffer means, and (ii) transmits the frames of data to the media access controller.

25. The network device of claim 14, wherein the read means transfers the data from the first buffer means to the physical-layer means again when needed in half-duplex mode.

26. The network device of claim 14, wherein the physical-layer means (i) receives a second pause frame from the media access controller, and (ii) transmits a signal representing the second pause frame.

27. A method comprising:
   storing, in a first-in first-out buffer of a network device, data received at a first data rate from a media access controller, wherein the network device includes the media access controller;
   transferring, at a second data rate, the stored data from the first-in first-out buffer to a physical-layer device, wherein the physical-laver device is configured to transmit a signal representing the data transferred to the physical-layer device; and
   in response to an amount of the stored data in the first-in first-out buffer exceeding a predetermined threshold,
      generating, via a control circuit in the network device, a pause frame,
      transmitting the pause frame to the media access controller, and
      based on the pause frame, adjusting the rate at which the media access controller transfers the data from the media access controller to the physical-layer device (i) via the first-in first-out buffer, and (ii) within the network device,
   wherein the control circuit is connected between the media access controller and the physical-layer device.

28. The method of claim 27, wherein the pause frame comprises an IEEE 802.3x pause frame.

29. The method of claim 27, further comprising:
   receiving signals representing frames of data sent by a peer device; and
   dropping one or more of the frames of data.

30. The method of claim 29, further comprising counting the dropped frames of data.

31. The method of claim 27, further comprising pausing the retrieving of the stored data in response to receiving a second signal representing a second pause frame.

32. The method of claim 31, wherein the second pause frame comprises an IEEE 802.3x pause frame.

33. The method of claim 27, further comprising generating the signal representing the retrieved data again when needed in half-duplex mode.

34. The method of claim 27, further comprising:
   receiving a second pause frame from the media access controller; and
   transmitting a signal representing the second pause frame.

35. A non-transitory computer-readable medium having tangibly stored thereon a computer program executable on a processor, the computer program comprising:
   instructions for storing, in a first-in first-out buffer of a network device, data received at a first data rate from a media access controller, wherein the network device includes the media access controller;

instructions for transferring, at a second data rate, the stored data from the first-in first-out buffer to a physical-layer device, wherein the physical-layer device is configured to generate a signal representing the data transferred to the physical-layer device; and instructions for, in response to an amount of the stored data in the first-in first-out buffer exceeding a predetermined threshold,
generating, via a control circuit in the network device, a pause frame,
transmitting the pause frame to the media access controller, and
adjusting, based on the pause frame, a rate at which the media access controller transfers the data from the media access controller to the physical-layer device (i) via the first-in first-out buffer, and (ii) within the network device, wherein the control circuit is connected between the media access controller and the physical-layer device.

36. The non-transitory computer-readable medium of claim 35, wherein the pause frame comprises an IEEE 802.3x pause frame.

37. The non-transitory computer-readable medium of claim 35, wherein the computer program further comprises:
instructions for receiving signals representing frames of data sent by a peer device; and
instructions for dropping one or more of the frames of data.

38. The non-transitory computer-readable medium of claim 37, wherein the computer program further comprises instructions for counting the dropped frames of data.

39. The non-transitory computer-readable medium of claim 35, wherein the computer-readable medium further comprises instructions for pausing the retrieving of the data in response to receiving a second signal representing a second pause frame.

40. The non-transitory computer-readable medium of claim 39, wherein the second pause frame comprises an IEEE 802.3x pause frame.

41. The non-transitory computer-readable medium of claim 35, wherein the computer program further comprises instructions for generating the signal representing the retrieved data again when needed in half-duplex mode.

42. The network device of claim 1, further comprising a physical-layer circuit, wherein:
the physical-layer circuit comprises the first first-in first-out buffer and the physical-layer device; and
the media access controller is configured to stop transmitting data to the physical-layer circuit based on the pause frame.

43. The network device of claim 42, wherein the media access controller is configured to stop transmitting data to the physical-layer circuit for an interval specified by the pause frame.

44. The network device of claim 1, further comprising:
a host configured to transmit the data to the media access controller; and
a physical-layer circuit that comprises the first first-in first-out buffer and the physical-laver device,
wherein the media access controller is configured to transmit the data to the physical layer circuit, and
wherein the physical-layer device is configured to transmit the signal representing the data to a peer network device.

45. The network device of claim 44, wherein the host, the media access controller, the first-in first-out buffer, the physical-layer device, and the control circuit are implemented on an integrated circuit.

46. The network device of claim 1, further comprising a host, wherein the media access controller is configured to receive the data from the host.

47. The network device of claim 46, wherein:
the data is transmitted from the host to a peer network device via the media access controller, the first first-in first-out buffer and the physical-layer device;
the physical layer device transmits the signal representing the data to the peer network device; and
the physical layer device is separate from the media access controller, the first first-in first-out buffer, and the peer network device.

48. The network device of claim 24, wherein the media access controller is configured to transmit the data to the physical-layer means via the buffer means subsequent to a host transmitting the data to the media access controller.

49. The network device of claim 1, wherein:
the media access controller is configured to operate at a first rate when the physical-layer device is operating at a first speed; and
the media access controller is configured to operate at a second rate when the physical-layer device is operating at a second speed, wherein the second speed is (i) less than the first speed and (ii) is greater than or equal to 10 Mbps.

50. The network device of claim 1, wherein the amount of the data stored in the first first-in first-out buffer exceeds the predetermined threshold when a data rate of the media access controller exceeds a data rate of the physical-layer device.

51. The network device of claim 1, wherein the first first-in first-out buffer is connected between the media access controller and the physical-layer device.

* * * * *